(12) United States Patent
Abeles

(10) Patent No.: US 12,733,568 B2
(45) Date of Patent: Sep. 15, 2026

(54) APPARATUS AND METHOD OF GROWING VEGETATION IN AN ARID ENVIRONMENT

(71) Applicant: VIRIDIS ARBOR LLC, Verona, NJ (US)

(72) Inventor: Gary E. Abeles, Verona, NJ (US)

(73) Assignee: VIRIDIS ARBOR LLC, Verona, NJ (US)

( * ) Notice: Subject to any disclaimer, the term of this patent is extended or adjusted under 35 U.S.C. 154(b) by 0 days.

(21) Appl. No.: 19/563,821

(22) Filed: Mar. 11, 2026

(65) Prior Publication Data

US 2026/0198407 A1 Jul. 16, 2026

Related U.S. Application Data

(63) Continuation-in-part of application No. 19/317,745, filed on Sep. 3, 2025, now Pat. No. 12,593,744, which
(Continued)

(51) Int. Cl.
*A01C 14/00* (2006.01)
*A01C 1/04* (2006.01)
(Continued)

(52) U.S. Cl.
CPC .............. *A01C 14/00* (2013.01); *A01C 1/044* (2013.01); *A01G 13/21* (2025.01); *A01G 20/20* (2018.02);
(Continued)

(58) Field of Classification Search
CPC ........ A01G 20/20; A01G 20/10; A01G 13/30; A01G 13/32; A01G 13/33; A01G 24/35; A01C 1/044; A01C 1/046; A01C 14/00
(Continued)

(56) References Cited

U.S. PATENT DOCUMENTS 3,698,131 A * 10/1972 Kesinger ................ A01G 9/242
47/29.1
3,733,745 A * 5/1973 Ingerstedt .............. A01G 9/029
47/77
(Continued)

FOREIGN PATENT DOCUMENTS

CN 106414614 9/2019
FR 3013943 A1 * 6/2015 ............. A01G 13/33
(Continued)

OTHER PUBLICATIONS

International Search Report and Written Opinion for PCT Application No. PCT/US2025/038625, mail date Nov. 19, 2025, 12 pages.

*Primary Examiner* — Monica L Perry
(74) *Attorney, Agent, or Firm* — Maine Cernota & Curran

(57) ABSTRACT

A method and apparatus for cultivating vegetation in an arid environment includes rooting immature vegetation in a mat combined with a super absorbent polymer ("SAP") and, in embodiments, fertilizer, sand, and/or soil; providing a sloping area; installing the mat in a lowest portion of the sloping area; and covering the mat with a perforated, transparent or semi-transparent cover. The transparent cover can be placed on or suspended above the mat. Rainwater falling onto the sloping area drains to the mat. The sloping area can be shaped as a bowl or crescent moon. A water barrier can be provided on or below a surface of the sloping area. A water reservoir can be provided below the mat with at least one wick extending from the mat to the water reservoir. Hollow tubes surrounding the wicks can extend downward from the mat to enable excess water to flow into the reservoir.

20 Claims, 13 Drawing Sheets

Related U.S. Application Data is a continuation-in-part of application No. 19/229,385, filed on Jun. 5, 2025, now Pat. No. 12,453,303, which is a continuation-in-part of application No. 19/065,443, filed on Feb. 27, 2025, now Pat. No. 12,349,618, which is a continuation-in-part of application No. 19/003,522, filed on Dec. 27, 2024, now Pat. No. 12,532,801, which is a continuation-in-part of application No. 17/667,306, filed on Feb. 8, 2022, now Pat. No. 12,213,397, which is a continuation-in-part of application No. 16/853,981, filed on Apr. 21, 2020, now Pat. No. 11,277,962, which is a continuation of application No. 15/476,017, filed on Mar. 31, 2017, now Pat. No. 10,660,264, which is a continuation-in-part of application No. 14/203,872, filed on Mar. 11, 2014, now Pat. No. 9,629,341.

(60) Provisional application No. 61/786,721, filed on Mar. 15, 2013.

(51) Int. Cl.

| | |
|---|---|
| ***A01G 13/21*** | (2025.01) |
| ***A01G 20/20*** | (2018.01) |
| *A01C 21/00* | (2006.01) |
| *A01G 24/35* | (2018.01) |

(52) U.S. Cl.
CPC .............. *A01C 21/00* (2013.01); *A01G 24/35* (2018.02); *Y02A 40/28* (2018.01)

(58) Field of Classification Search
USPC ..................................... 47/1.01 F, 1.01 T, 56
See application file for complete search history.

(56) References Cited

U.S. PATENT DOCUMENTS 3,962,823 A * 6/1976 Zipperer, III .......... A01G 24/50 383/105
4,285,162 A * 8/1981 Hilton .................. A01G 9/1438 47/29.1
4,318,248 A * 3/1982 Muldner ................ A01G 20/20 47/56
4,353,946 A * 10/1982 Bowers .................. E02D 17/20 428/326
4,798,023 A * 1/1989 Morssinkhof .......... A01G 13/24 47/29.1
5,338,131 A * 8/1994 Bestmann ................. E02B 3/12 405/15
5,423,148 A * 6/1995 Thornhill ................. A01G 9/12 47/29.1
5,598,661 A * 2/1997 Eiderman .............. A01G 9/247 203/DIG. 1
5,641,244 A * 6/1997 Bestmann ............... E02B 3/125 405/15
5,887,382 A * 3/1999 Marshall ................ A01C 1/044 47/74
5,911,632 A * 6/1999 Ko .......................... A01C 7/00 111/199
8,256,160 B2 * 9/2012 Rubin ...................... B01J 20/16 47/58.1 SC
10,513,829 B2 * 12/2019 Jones ...................... E01C 13/08
10,687,474 B2 * 6/2020 Abeles ................... A01C 1/044
12,349,618 B2 * 7/2025 Abeles ................... A01G 20/20
12,453,303 B2 * 10/2025 Abeles ................... A01G 29/00
2002/0134010 A1 * 9/2002 Rohrborn, Jr. ......... A01G 13/26 47/29.1
2005/0254899 A1 * 11/2005 Tyler ....................... E02D 17/20 405/15
2007/0163172 A1 * 7/2007 Savich ................... A01C 1/044 47/56
2007/0193116 A1 * 8/2007 Luckett .................. A01G 20/20 47/65.9
2009/0178334 A1 7/2009 Henderson
2009/0205248 A1 * 8/2009 Phelps ................... A01G 13/24 47/29.1
2009/0293350 A1 * 12/2009 Kania .................... A01G 13/10 47/20.1
2010/0050509 A1 * 3/2010 Luckett .................. A01G 20/20 47/65.9
2010/0236142 A1 * 9/2010 Drewry .................. A01G 13/20 47/29.1
2013/0192131 A1 * 8/2013 Abahusayn .............. A01G 9/14 47/17
2015/0201565 A1 * 7/2015 Toye ...................... A01G 13/21 47/29.1
2022/0159904 A1 5/2022 Abeles
2025/0194457 A1 * 6/2025 Abeles ................... A01C 1/044
2025/0295055 A1 * 9/2025 Abeles ................... A01G 13/21

FOREIGN PATENT DOCUMENTS

WO 0164017 A1 9/2001
WO 2019028081 A1 2/2019

* cited by examiner 300
400

500
700
100
200
204
400

APPARATUS AND METHOD OF GROWING VEGETATION IN AN ARID ENVIRONMENT

RELATED APPLICATIONS

This application is a continuation in part of U.S. application Ser. No. 19/317,745, filed on Sep. 3, 2025. Application Ser. No. 19/317,745 is a continuation in part of U.S. application Ser. No. 19/229,385, filed on Jun. 5, 2025, now U.S. Pat. No. 12,453,303. Application Ser. No. 19/229,385 is a continuation in part of U.S. application Ser. No. 19/065,443, filed on Feb. 27, 2025, now U.S. Pat. No. 12,349,618. Application Ser. No. 19/065,443 is a continuation in part of U.S. application Ser. No. 19/003,522, filed on Dec. 27, 2024, now U.S. Pat. No. 12,532,801. Application Ser. No. 19/003,522 is a continuation in part of U.S. application Ser. No. 17/667,306, filed on Feb. 8, 2022, now U.S. Pat. No. 12,213,397. Application Ser. No. 17/667,306 is a continuation in part of U.S. application Ser. No. 16/853,981, filed on Apr. 21, 2020, now U.S. Pat. No. 11,277,962. Application Ser. No. 16/853,981 is a continuation of U.S. application Ser. No. 15/476,017, filed Mar. 31, 2017, now U.S. Pat. No. 10,660,264. Application Ser. No. 15/476,017 is a continuation in part of U.S. application Ser. No. 14/203,872, filed Mar. 11, 2014, now U.S. Pat. No. 9,629,341. Application Ser. No. 14/203,872 claims the benefit of U.S. provisional application 61/786,721, filed Mar. 15, 2013. All of these applications are herein incorporated by reference in their entirety for all purposes.

FIELD OF THE INVENTION

The invention relates to apparatus and methods for growing vegetation in arid environments, and more specifically to apparatus and methods for capturing and retaining rainwater in an arid environment so as to enable germination and growth of new vegetation.

BACKGROUND OF THE INVENTION

While arid environments such as deserts and semi-deserts are often somewhat inhospitable to vegetation, nevertheless there are varieties of succulents and other vegetation that can survive and even thrive unassisted in all but the harshest environments. Under certain circumstances, it can be desirable to introduce new vegetation into an arid environment so as to stabilize the underlying sand or soil, reduce the prevalence of blown dust and sand, beautify the landscape, and/or re-establish an ecosystem after it has been damaged by industrial activity or by a natural disaster. Unfortunately, the initial introduction of such vegetation can be difficult and time consuming, due to the poor water retention of the sand or soil, the slow growth that is typical of desert and semi-desert vegetation, and the fragility of immature vegetation until it has established a sufficient root system to allow it to obtain water and to resist wind and excess sun exposure.

Furthermore, it may be desirable to grow other vegetation, such as edible food plants, in arid environments while minimizing the cost and labor associated with initiating and maintaining the vegetation.

Of course, scarcity of water is the feature that more or less defines an arid environment. When an arid location is devoid of mature vegetation this scarcity of water is typically multiplied, because high temperatures and the prevalence of unshaded sunshine can tend to quickly evaporate any moisture that is present. In addition, the ground in an arid environment is often very sandy, such that any precipitation that falls as rain or forms on the surface as dew tends to be absorbed quickly into the sand, wherein it settles to a depth that is beyond reach of the root systems of vegetation. Accordingly, even in arid environments that are subject to periodic heavy rainfalls interspersed with periods of very little rain, the rainwater is rapidly absorbed by the sandy soil, and does not remain available to immature vegetation during the dry periods between rainfalls.

Once vegetation is well established in an arid location, it can play a significant autogenic role in improving the environment by blocking direct sunlight and by capturing and retaining available moisture before it is absorbed or evaporated. Furthermore, over time, decomposing vegetation can reduce the porosity of the soil and thereby further improve the retention of water near the surface. However, even newly-planted vegetation that is adapted to arid environments often has a very difficult time surviving until it has matured. And, of course, food plants and other vegetation that is not adapted to arid environments require continued support when cultivated in an arid environment.

Existing methods for introducing and growing vegetation in arid ecosystems are typically expensive and risky, and the benefits are often short-lived. Current approaches to arid ecosystem rehabilitation are extensions of traditional agronomic technologies developed under more hospitable climates, and require intensive tending and excessive use of irrigation to have any chance of success. Often, such an expenditure of time and resources is not practical, and serves as a barrier to the restoration and/or improvement of arid environments, and to farming and other cultivation of non-arid vegetation in arid environments.

Furthermore, traditional approaches to introducing such vegetation typically require construction and use of extensive irrigation systems and other structures and maintenance equipment that are not natural to the environment. Even if they are subsequently removed, the environmental damage that is left behind can remain for an extended period of time.

What is needed, therefore, is an apparatus and method for introducing and growing vegetation in arid environments while minimizing both initial and long-term maintenance requirements, including water usage.

SUMMARY OF THE INVENTION

The present invention is an apparatus and method for introducing and growing vegetation in arid environments while minimizing maintenance requirements, including water usage. In embodiments, the disclosed apparatus is used to introduce new vegetation that is compatible with arid environments into an arid location with little or no initial maintenance period. The invention is well-suited for cultivating vegetation in environments that are subject to periodic heavy rainfalls interspersed with periods of very little rain.

According to the disclosed invention, a mat is prepared and is impregnated with a "super absorbent polymer" or "SAP." The mat can be biodegradable, and in some of these embodiments the mat includes coir. In various embodiments the SAP is biodegradable, being for example a cellulose-based or starch-based polymer.

In some embodiments, fertilizer is included with the mat. And in various embodiments at least one of sand and soil is included with the mat. In some embodiments, the included sand or soil has a composition that is similar to sand or soil that is indigenous to the arid location.

Vegetation is allowed to sprout and/or take root in the mat. In some embodiments, the vegetation is initially sprouted and rooted under controlled conditions remote from the arid location, and then the mat is transferred to the arid location. In other embodiments, the vegetation sprouts and/or takes root after the mat is placed at the arid location.

Once the mat is placed at the arid location, it is covered by a perforated cover sheet that is transparent or semi-transparent. The cover sheet serves as a physical barrier to water vapor beneath the cover that is formed by evaporating dew and by any moisture that is evaporated from the ground or mat, so that the water vapor tends to condense on the under-side of the cover sheet, and to drip back onto the mat, where it is absorbed by the SAP.

In some embodiments the cover is placed directly onto the mat, whereby the growing vegetation lifts the cover, and in some embodiments eventually breaks through the cover. In other embodiments, the cover is supported above the mat by a support structure, such as a plurality of stakes. The stakes or other support structure can be ventilated around its edges so as to avoid excess "greenhouse" heating of the vegetation. The perforations can be made in locations where depressions in the cover sheet will naturally form between the stakes or other supports, so that any rain that falls onto the cover sheet will drain through the perforations and be absorbed by the SAP in the underlying mat. In embodiments of the first general aspect, the cover sheet is made of a biodegradable cellulosic material. Similarly, if included, the stakes or other support structure of the cover sheet can be made of a biodegradable material such as coir or cellulose.

For use in areas of intense sunlight, the opacity of the cover sheet can be increased by printing a pattern onto the sheet, adding a dye to the sheet material, or by any other means known in the art, so as to reduce the intensity of light reaching the mat.

Embodiments further include a water barrier placed below the mat which prevents any water that is not retained by the mat and SAP from reaching the underlying soil or sand beneath the mat. This feature can be especially helpful in sandy locations where any moisture that reaches the underlying sand will be quickly absorbed and lost. The water barrier can be a plastic sheet. In some embodiments, the water barrier can be cellulosic or otherwise biodegradable. In lieu of a simple water barrier, some embodiments provide a water reservoir underneath the mat that is configured to retain any water that penetrates down through the mat, so that the water can be delivered back to the mat as needed via interconnecting wicks.

A significant feature of embodiments of the invention is that most or all of the apparatus is biodegradable or removable, so that there is no lasting effect on the natural appearance of the environment after the mat has biodegraded and the vegetation is fully established. Depending on the embodiment, elements of the fertilizer and/or the SAP may not degrade as quickly as the mat. However, in these embodiments any SAP and/or fertilizer that does not biodegrade will mix easily with the underlying soil or sand, such that they enhance the quality of the soil or sand and do not affect the appearance of the landscape. If sand or soil is included with the mat, it is selected in some embodiments to be similar to sand or soil that naturally occurs at the arid location, so that the sand or soil does not change the appearance or properties of the location.

In addition to gathering and retaining water that falls directly onto the mat, for example during a rain storm, the present invention also includes a sloping area that is configured to capture water that falls near but not onto the mat, and to cause the water to drain onto the mat. While rainfall is rare in arid regions, such that the total annual rainfall is very low, nevertheless the rain can be heavy when a storm does occur, such that even sandy ground is temporarily water saturated, and rainwater is able to flow across the water-saturated ground. The present invention takes advantage of this fact by placing the mat at a lowest location of a sloping area where flowing rainwater will tend to drain. Embodiments of the disclosed method include identifying and/or intentionally creating a sloping area that will direct rainwater to the mat, and embodiments of the disclosed apparatus include both the mat and the sloping area. In various embodiments, the sloping area is shaped as a bowl. In other embodiments the sloping area is shaped as a crescent moon configured to funnel draining water to the mat. In some embodiments, a water barrier is placed onto or under the surface of the sloping area, thereby further inhibiting absorption of the rainwater into the sand or soil as it drains toward the mat. The water barrier can be a plastic sheet. In some embodiments, the water barrier can be cellulosic or otherwise biodegradable.

A first general aspect of the present invention is a method for cultivating vegetation in an arid region. The method includes providing a mat, providing a super-absorbent polymer ("SAP") cooperative with the mat, providing seeds of a selected variety of vegetation incorporated in the mat, identifying or creating a sloping area in the arid region, the sloping area being configured to cause rainwater to drain to a lowest portion thereof, installing the mat in the lowest portion of the sloping area, and covering the mat by placing a mat cover made from a transparent or semi-transparent material suspended above the mat or placed directly onto and in physical contact with substantially all of an upper surface of the mat. The mat cover forms a physical barrier configured to cause water vapor beneath the mat cover to condense on an underside of the mat cover and drip onto the mat, and is perforated at locations that are spaced apart, thereby allowing rain that falls onto the mat cover to drain through the perforations and be absorbed by the SAP that is cooperative with the mat.

In embodiments, the mat is a woven mat.

In any of the above embodiments, the sloping area can be a bowl-shaped area, the lowest portion thereof being substantially in a center of the bowl-shaped area. Or, the sloping area can be shaped as a crescent moon, having ends that curve inward toward the mat and direct virtually all rainwater that falls on the sloping area toward the mat.

In any of the above embodiments, the method can further comprise installing a water impermeable barrier on or beneath a surface of the sloping area. Or, the method can further include installing a reservoir below the mat. In some of these embodiments, installing the reservoir comprises installing at least one wick configured to extend from the mat downward into the water reservoir, said wick being configured to draw water from the water reservoir to the SAP of the mat. Any of these embodiments can include at least one hollow tube extending from the mat to the water reservoir, said hollow tube being configured to allow excess water to flow from the mat into the water reservoir.

A second general aspect of the present invention is an apparatus for cultivating vegetation at an inhospitable location. The apparatus includes a mat, a super-absorbent polymer ("SAP") cooperative with the mat, seeds incorporated in the mat, a mat cover made from a transparent or semi-transparent material and configured to cover the mat, said mat cover being suspendable above the mat, or being placeable directly onto the mat so that it is in direct physical contact with the mat, and a sloping area located or created in the arid region, the sloping area being configured to cause rainwater to drain to a lowest portion thereof in which the mat can be installed.

The mat cover forms a physical barrier configured to cause water vapor beneath the mat cover to condense on an underside of the mat cover and drip onto the mat. The mat cover is perforated at locations that are spaced apart, thereby allowing rain that falls onto the mat cover to drain through the perforations and be absorbed by the SAP that is cooperative with the mat.

In embodiments, the mat is a woven mat.

In any of the above embodiments, the sloping area can be a bowl-shaped area, the lowest portion thereof being substantially in a center of the bowl-shaped area. Or the sloping area can be shaped as a crescent moon, having ends that curve inward toward the mat and direct virtually all rainwater that falls on the sloping area toward the mat.

In any of the above embodiments, the apparatus can further comprise a water impermeable barrier installed on or beneath a surface of the sloping area. Or the apparatus can further include a reservoir installed below the mat. In some of these embodiments, installing the reservoir can comprise installing at least one wick configured to extend from the mat downward into the water reservoir, said wick being configured to draw water from the water reservoir to the SAP of the mat. In some of these embodiments, the wick can include at least one of nutrients and fertilizer, the at least one of nutrients and fertilizer being configured to be transported into the mat together with the water that is drawn from the water reservoir. Any of these embodiments can further include at least one hollow tube configured to extend from the mat to the water reservoir, said hollow tube being configured to allow excess water to flow from the mat into the water reservoir. In some of these embodiments, the hollow tube surrounds at least one of the wicks. In some of these embodiments, the at least one wick extends below a lowest end of the hollow tube. And in any of these embodiments, the hollow tube can extend downward from a region of the mat where excess water is likely to accumulate.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is an apparatus and method for introducing and growing vegetation in arid environments while minimizing maintenance requirements, including water usage. The disclosed invention is especially well suited for cultivating vegetation in environments that are subject to periodic heavy rainfalls interspersed with periods of very little rain.

Figure 1:
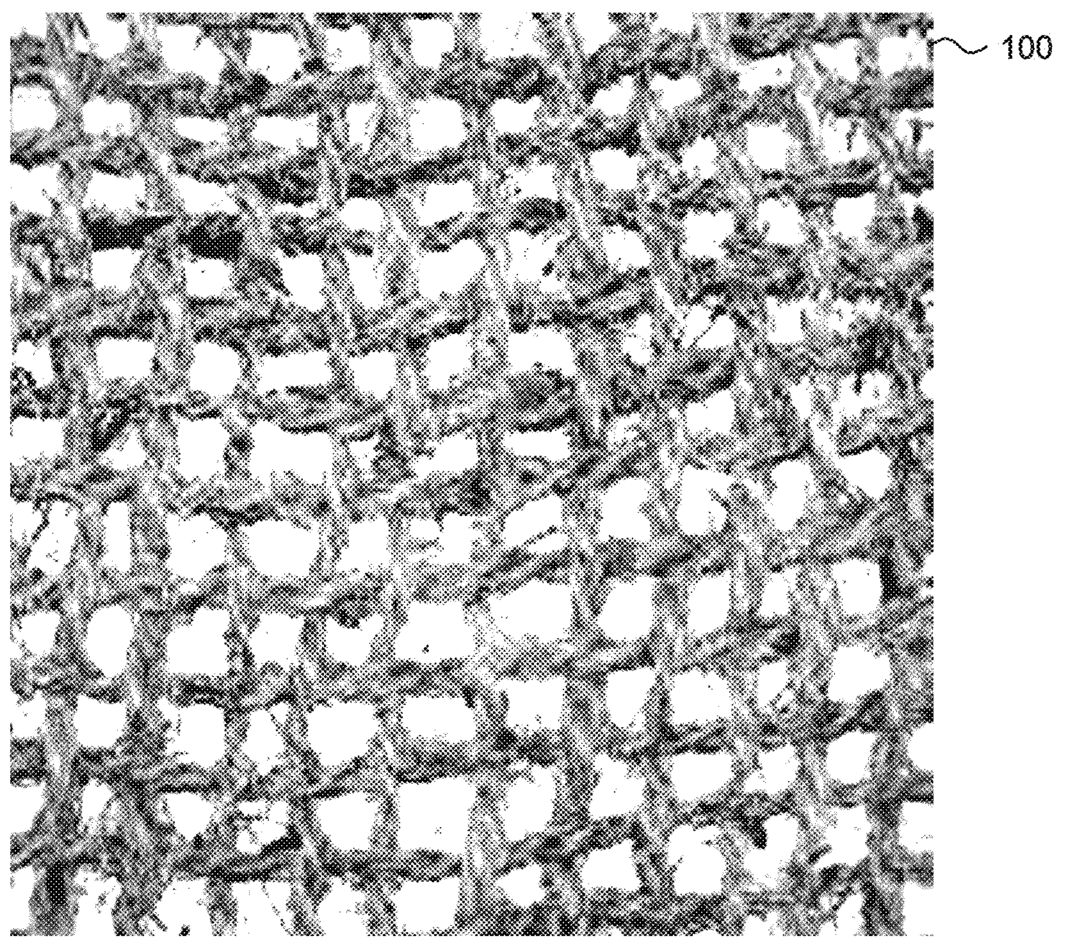
FIG. 1 is a top view of a coir fiber mat used in an embodiment of the present invention.

With reference to FIG. 1, a mat 100 is prepared and is impregnated with a "super absorbent polymer" or "SAP." In embodiments, the mat 100 is biodegradable, and in some of these embodiments the mat 100 includes coir. In various embodiments the SAP is biodegradable, being for example a cellulose-based or starch-based polymer.

In some embodiments, fertilizer is included with the mat 100. And in various embodiments, at least one of sand and soil is included with the mat 100. In some embodiments where sand or soil is included, the included sand or soil has a composition that is similar to sand or soil that is indigenous to the arid location.

Figure 2:
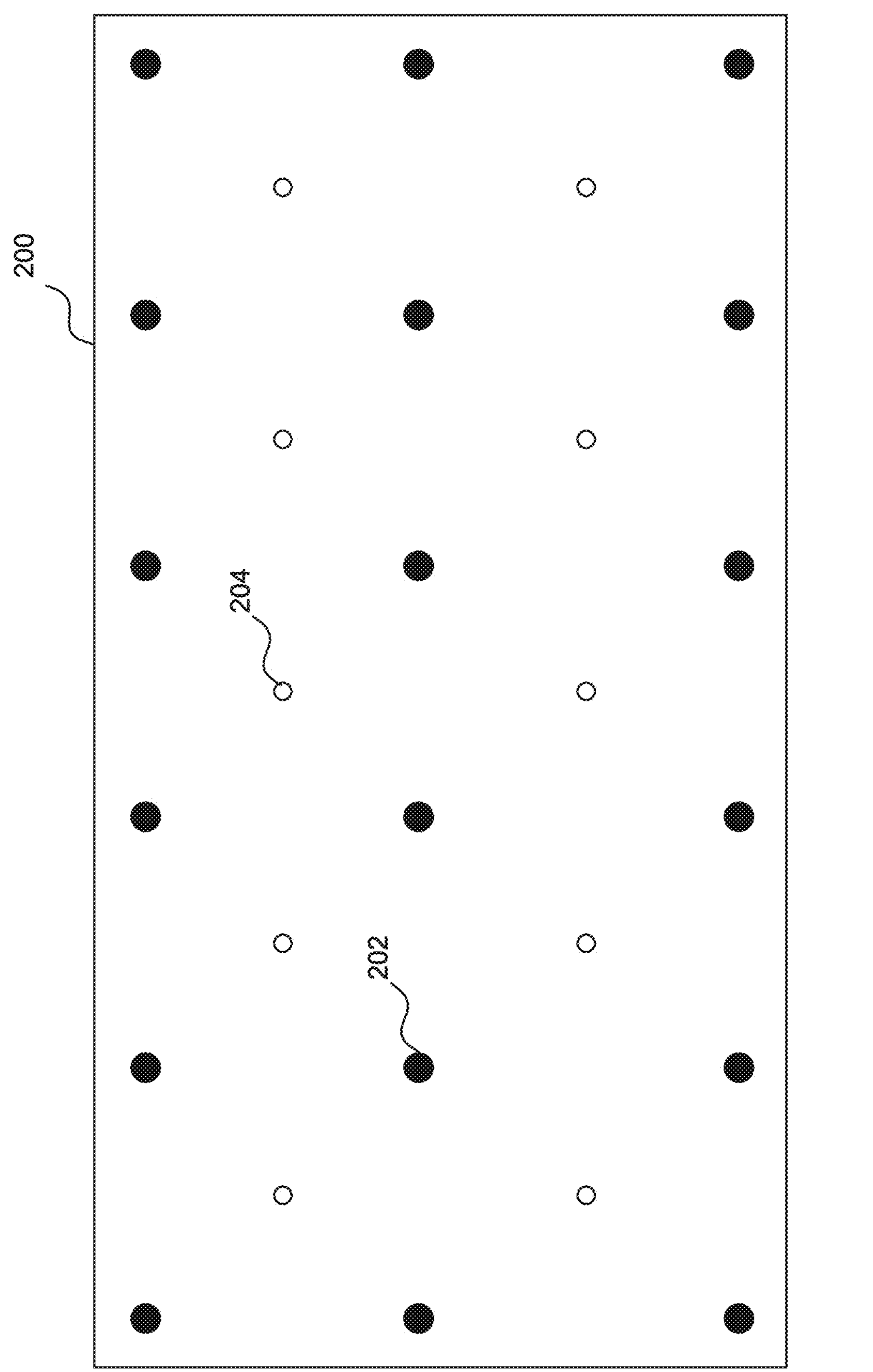
FIG. 2 is a top view of a perforated, transparent cover in an embodiment of the present invention.

With reference to FIG. 2, a transparent or semi-transparent cover sheet 200 is prepared. In embodiments, a supporting structure such as a set of support stakes 202 is configured to suspend the cover sheet 200 above the mat and vegetation 300. Perforations 204 are made in the cover sheet 200, so that any rain that falls onto the cover sheet will drain through the perforations and be absorbed by the SAP in the underlying mat. In the embodiment of FIG. 2, the perforations 204 are located between the stakes 202, in locations where depressions in the cover sheet 200 will naturally form.

In some embodiments, the cover sheet 200 and supporting structure 202 are biodegradable. For example, in embodiments the cover sheet 200 is made of a biodegradable cellulosic material, and the stakes 202 are made from coir or from a cellulosic substance.

Figure 3:
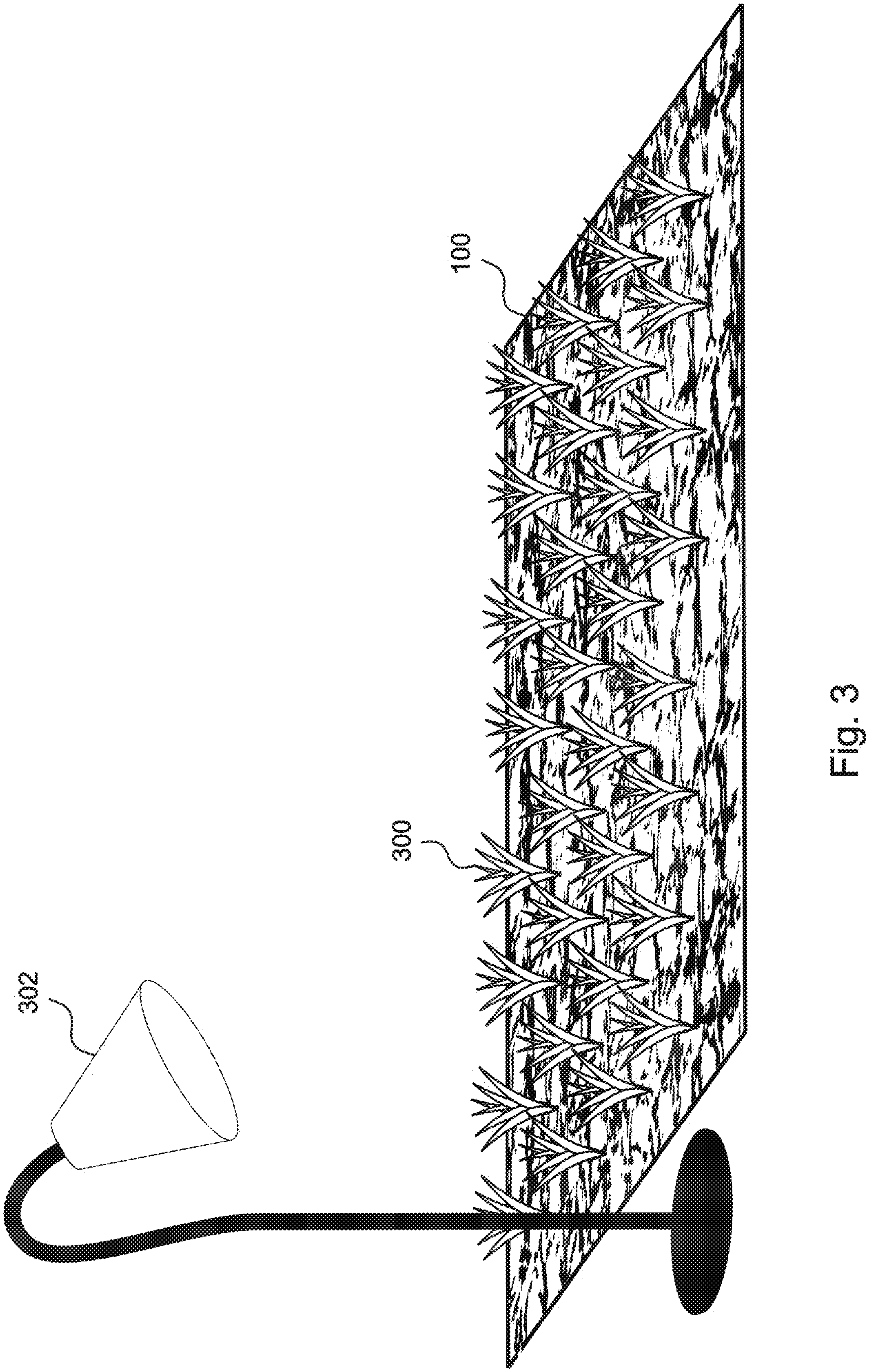
FIG. 3 is perspective view of the mat of FIG. 1 having been impregnated with SAP (not visible) and having vegetation that is compatible with an arid location sprouted and rooted therein under controlled conditions.
Figure 4:
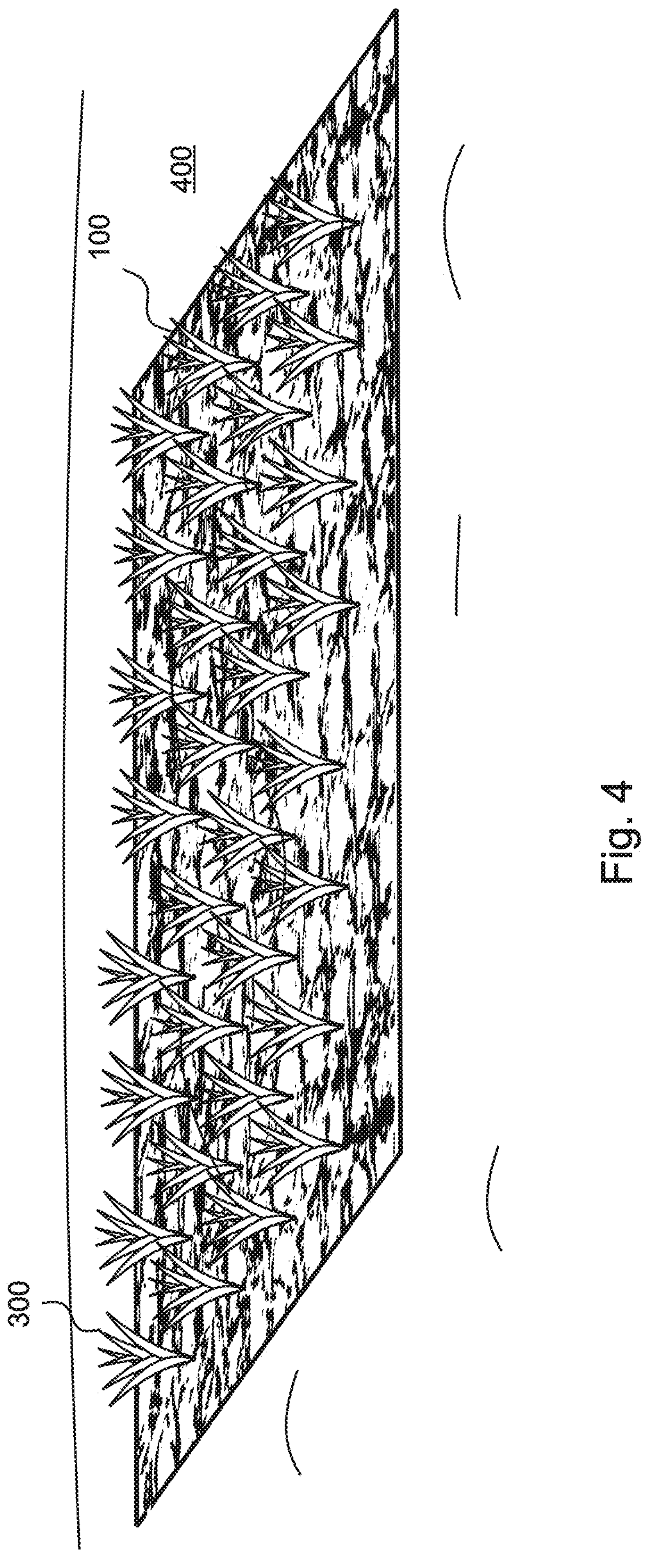
FIG. 4 is a perspective view of the mat and vegetation of FIG. 3, showing them in place on an arid location.

At least one selected variety of vegetation 300 is allowed to sprout and/or take root in the mat. With reference to FIG. 3, in some embodiments the vegetation 300 is allowed to sprout and take root in the mat 100 under controlled conditions, such as an indoor location with controlled temperature, humidity, and lighting 302. With reference to FIG. 4, once the vegetation 300 has taken root in the mat, the mat 100 with SAP and sprouted vegetation 300 (and in embodiments fertilizer, sand, and/or soil) is transferred to the arid location 400.

Figure 5:
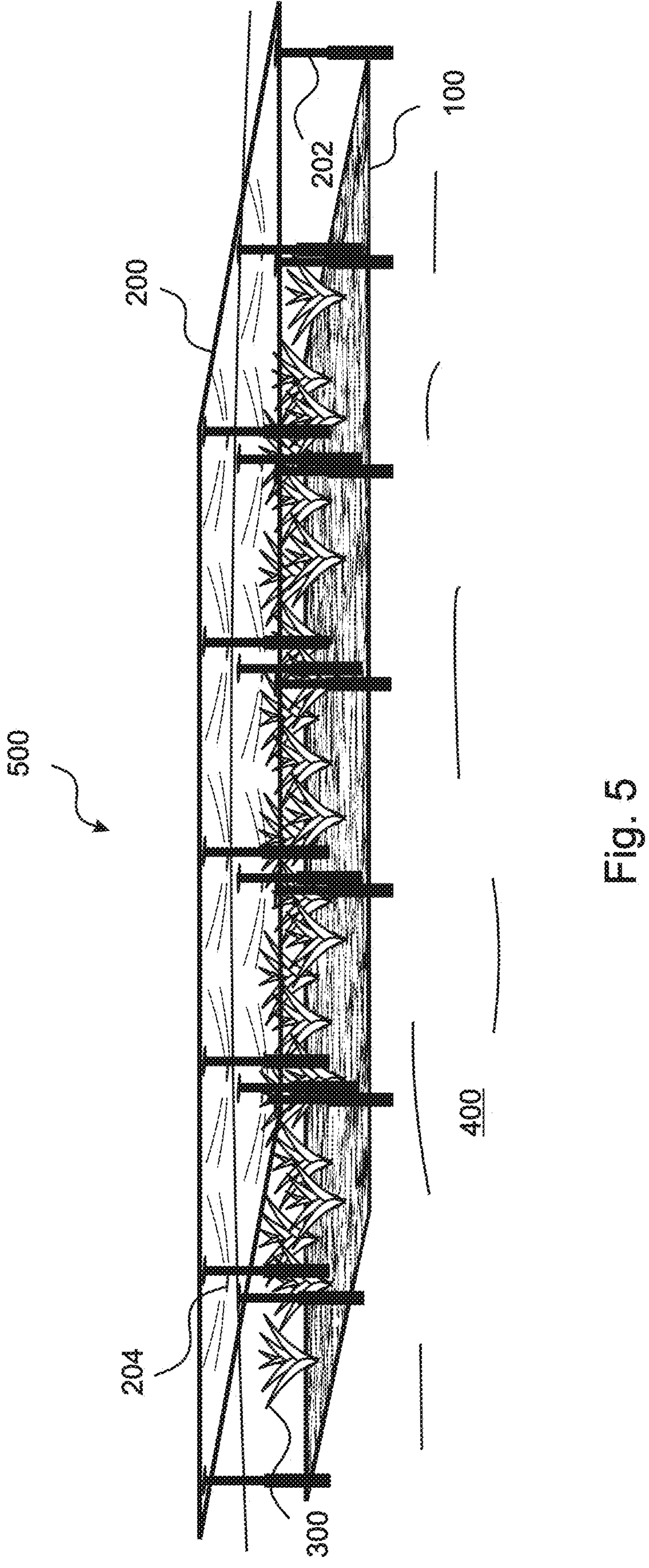
FIG. 5 is a perspective view of the mat and vegetation of FIG. 4 covered by the cover of FIG. 2.

With reference to FIG. 5, the combined mat, SAP, and vegetation 300 are then covered by the perforated, biodegradable cover sheet 200. The result is a mat "assembly" 500 that includes the mat 100, SAP, stakes 202 and cover 200. The cover sheet 200 serves as a physical barrier to water vapor that is formed below the sheet by evaporation of dew and of any other moisture from the ground 400. As a result, the water vapor tends to condense on the under-side of the cover sheet 200, and to drip back onto the mat 100, where it is absorbed by the SAP.

In the embodiment of FIG. 5, the cover 200 is supported by stakes 202 that are adjustable in height due to a threaded, telescoping configuration. Similar embodiments use other support structures that are either fixed or adjustable in height. In the illustrated embodiment, the cover 200 is elevated by the stakes 202 around its perimeter, such that the region below the cover 200 is ventilated, thereby avoiding excess "greenhouse" heating of the vegetation, and also enabling water to freely flow onto the mat 100 from a sloping area 1200, as is discussed in more detail below.

In some embodiments the cover 200 is transparent, as shown in FIG. 5. In similar embodiments, for example where there is excessive direct sunshine, the opacity of the cover sheet 200 is increased by printing a pattern onto the sheet 200, adding a dye to the sheet material, or by any other means known in the art, so as to reduce the intensity of light reaching the mat and vegetation 300, thereby simulating the shade that would be provided by mature vegetation in an established ecosystem.

Figure 6:
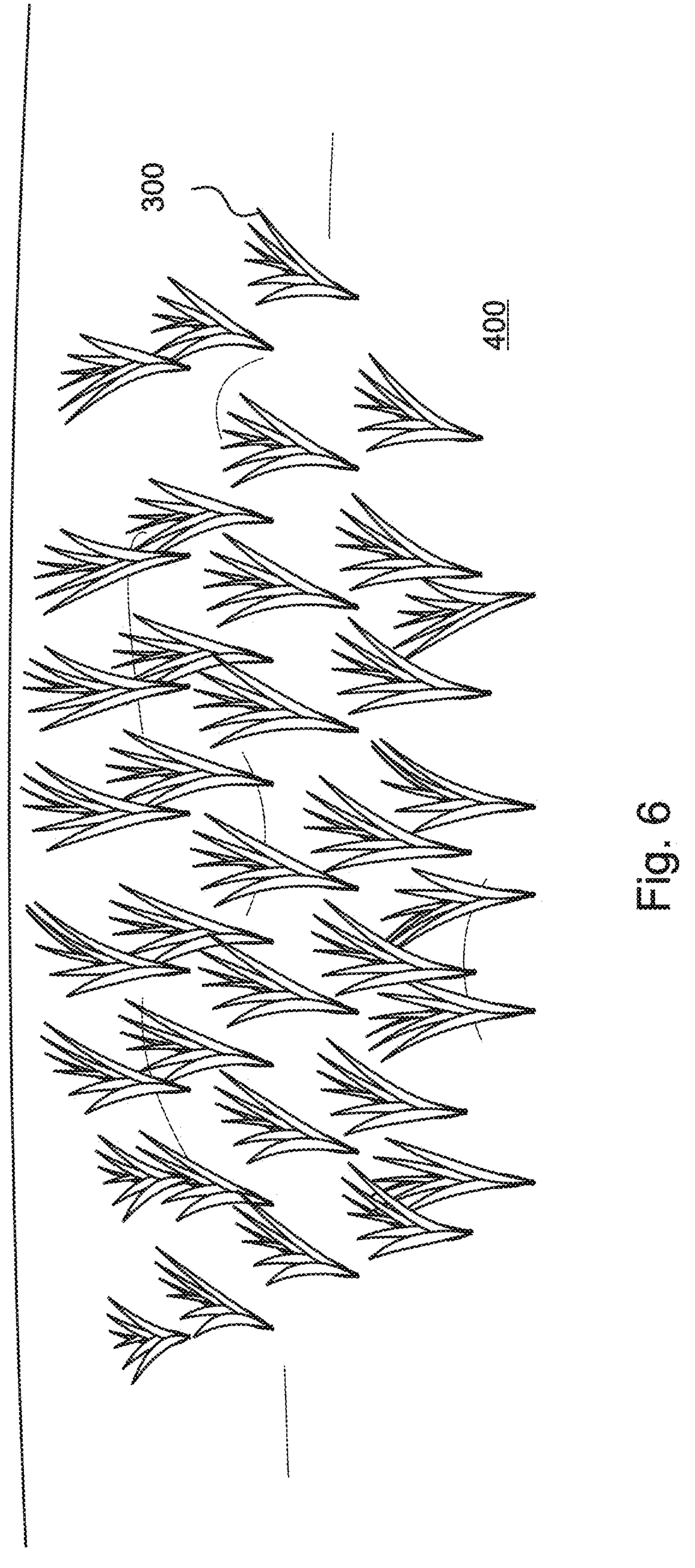
FIG. 6 is a perspective view of the arid location of FIG. 5 shown after the vegetation has been established in the underlying sand and soil, the mat has biodegraded, and the cover and support structure have been removed.

With reference to FIG. 6, in embodiments most or all of the mat assembly 500 is biodegradable or removable, so that there is minimal lasting effect on the natural appearance of the environment after the mat 100 has biodegraded and the vegetation has matured. In some of these embodiments, the cover sheet 200 and stakes 202 are removed after the vegetation 300 is well established, while in other embodiments the cover sheet 200 and/or stakes 202 are biodegradable, and need not be removed. Elements of the SAP and fertilizer (in some embodiments) may not degrade as quickly as the mat 100. However, any SAP and/or fertilizer that is not biodegraded will mix easily with the underlying soil or sand 400, such that they enhance the quality of the soil or sand 400 and will not affect the appearance of the landscape. If sand or soil is included with the mat 100, it is selected in embodiments to be similar to sand or soil that naturally occurs at the arid location 400, so that the sand or soil does not change the appearance or properties of the location 400.

Figure 7:
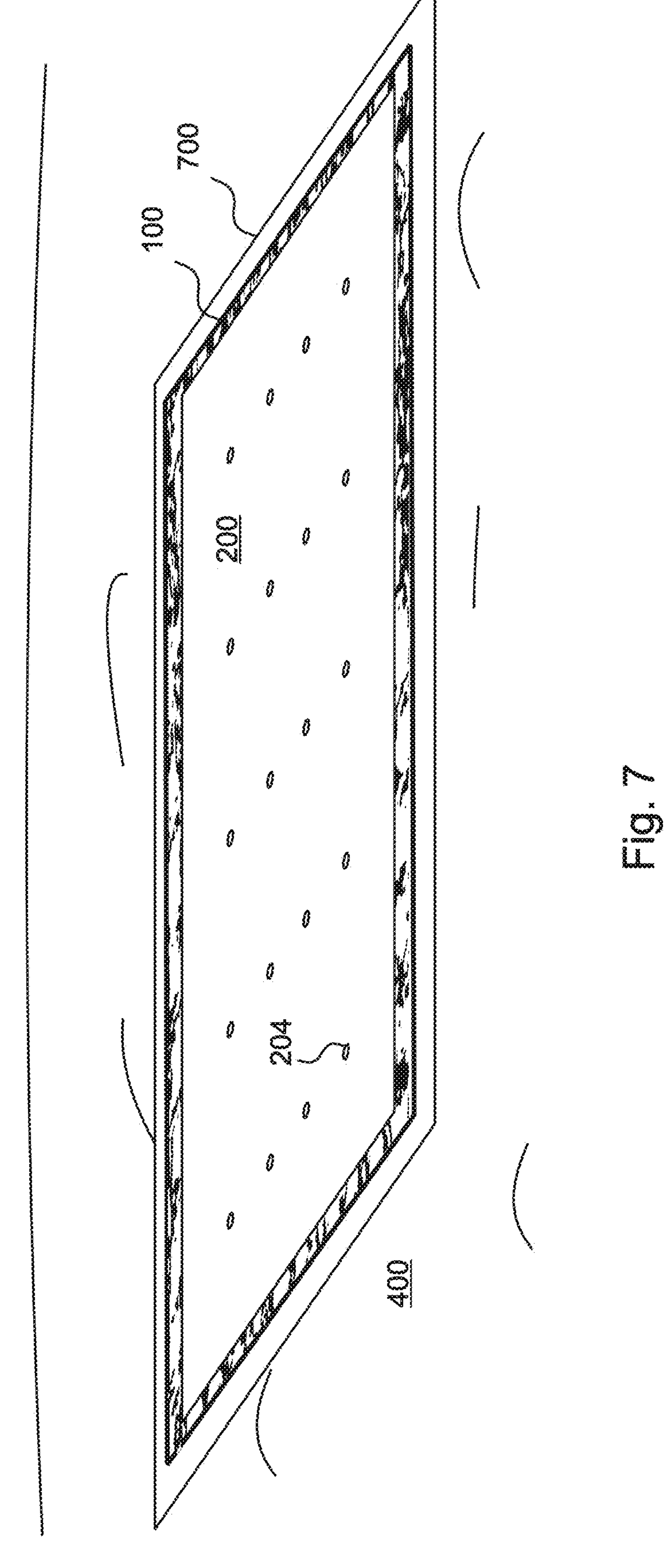
FIG. 7 is a perspective view of an embodiment that includes a water barrier beneath the mat, and wherein the transparent cover is frangible and is placed directly onto the mat.
Figure 8:
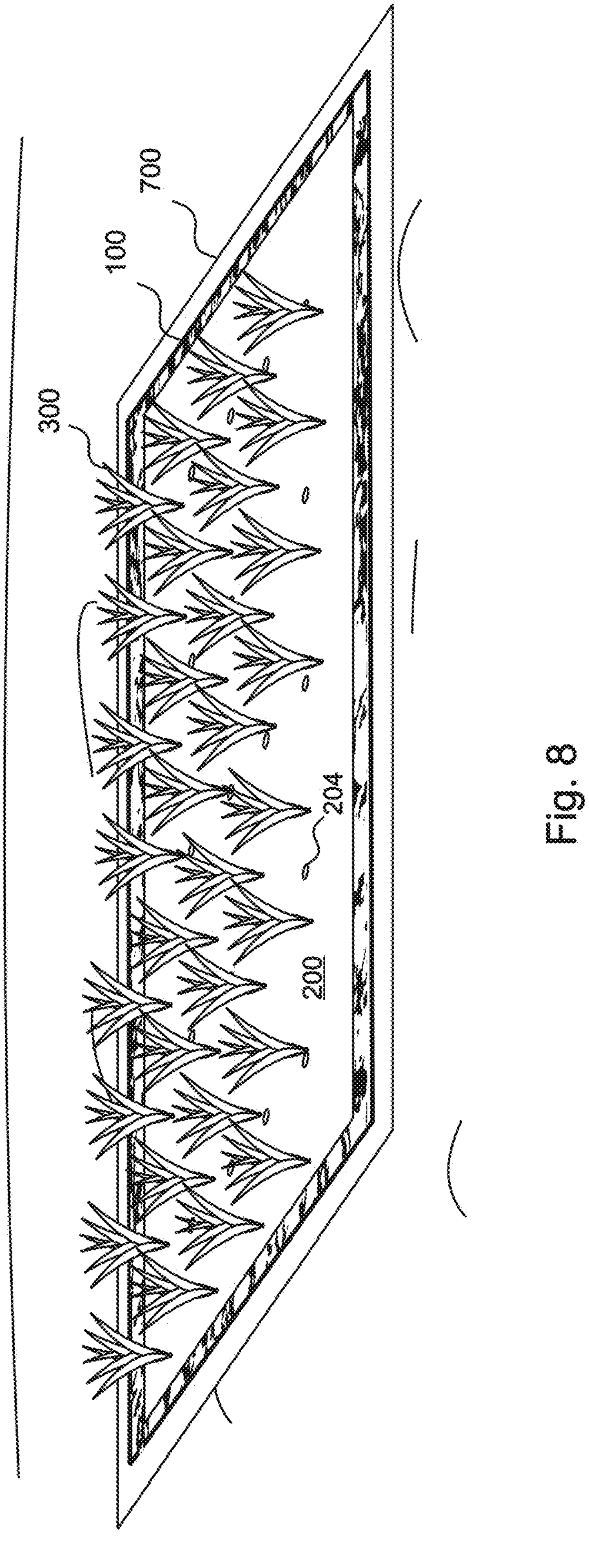
FIG. 8 is a perspective view of the embodiment of FIG. 7 shown after the vegetation has sprouted and broken through the transparent cover.

FIG. 3-5 are directed to an embodiment in which the vegetation 300 is initially sprouted and rooted in the mat 100 under controlled conditions, before the mat is placed at the arid location 400. In other embodiments, the vegetation 300 is allowed to germinate and take root in the mat 100 at the arid location. FIG. 7 is a perspective view of an embodiment in which the vegetation 300 is provided as seeds in the mat 100, and the mat assembly 700 further includes a perforated, frangible, biodegradable cover sheet 200 that is placed directed on top of the mat 100. In this embodiment, the seeds germinate and take root at the arid location 400, initially lifting the cover sheet 200 as they grow upward, and eventually breaking through the frangible cover sheet 200, as shown in FIG. 8. Water draining from a sloping area 1200 impacts the side of the mat 100 and is absorbed into the mat 100. The mat assembly 500 of FIG. 6 can also be used to germinate vegetation 300 at the arid location 400.

The embodiment of FIGS. 7 and 8 further includes a water barrier 700 placed below the mat 100 which prevents any water that is not retained by the mat 100 and SAP from reaching the underlying soil or sand 400. This feature can be especially helpful in sandy locations where any moisture that reaches the underlying sand will be quickly absorbed and lost. The water barrier 700 can be a plastic sheet, and can be cellulosic or otherwise biodegradable.

Figure 9:
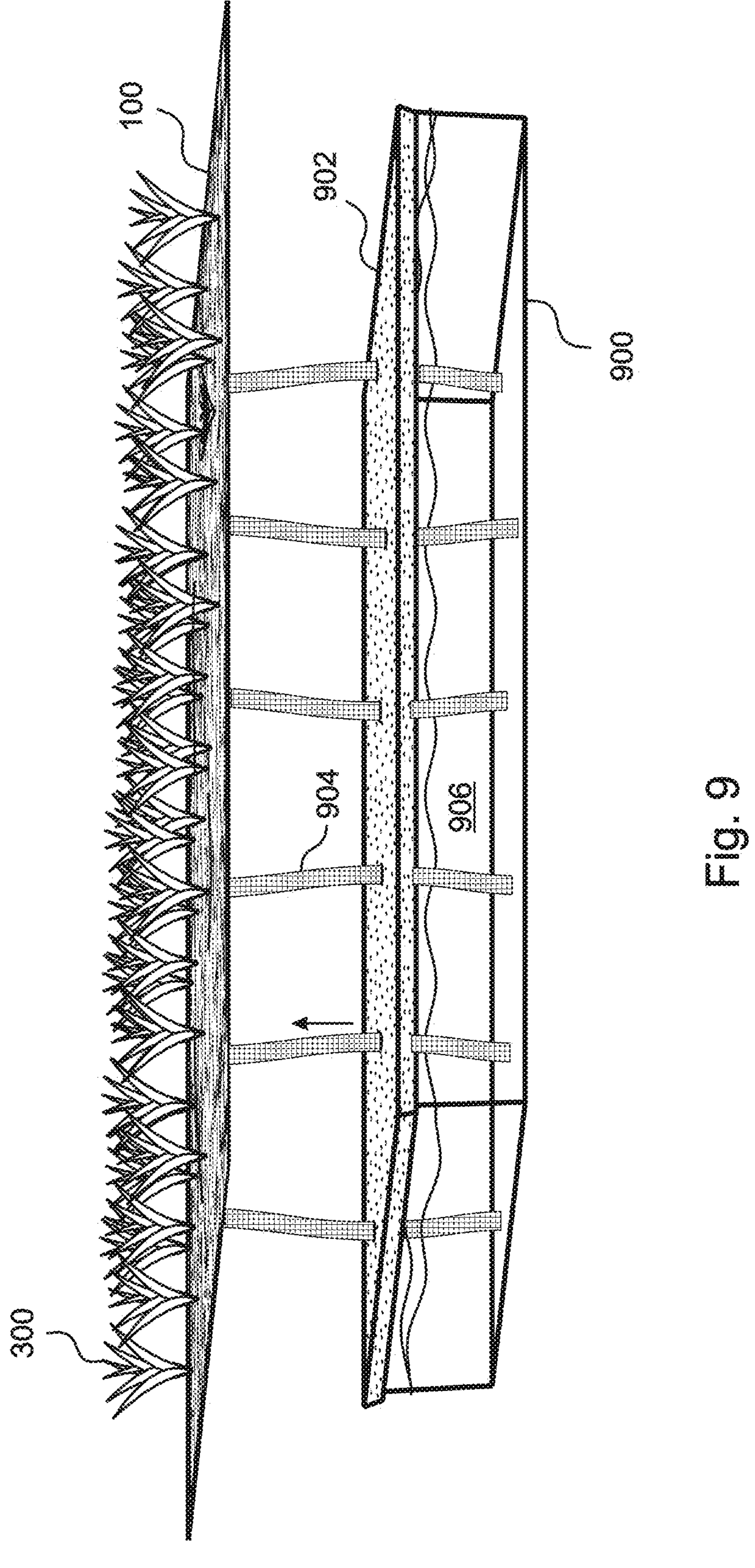
FIG. 9 is a perspective side view of an embodiment of the present invention that includes a water reservoir located beneath the mat and wicks extending from the mat into the water reservoir.

With reference to FIG. 9, in some embodiments a water reservoir 900 is provided below grade, and the mat 100 is positioned above the water reservoir 900. In the illustrated embodiment, the top of the water reservoir 900 is covered by a perforated lid 902. At least one wick 904 extends from the mat 100 downward through the lid 902 into the water reservoir 900. Accordingly, when water is plentiful and the SAP in the mat 100 is saturated, excess water will seep downward from the mat 100 through the perforated lid 902, and into the water reservoir 900. And when water is scarce, the wicks 904 will draw the stored water 906 from the water reservoir 900 back into the mat 100, thereby replenishing the SAP.

In embodiments, at least one of the wicks 904 includes at least one of cotton, nylon, and acrylic. In various embodiments, at least one of the wicks 904 is infused with at least one of nutrients and fertilizer that is transported to the mat 100 along with the water that is wicked from the water reservoir 900.

Figure 10:
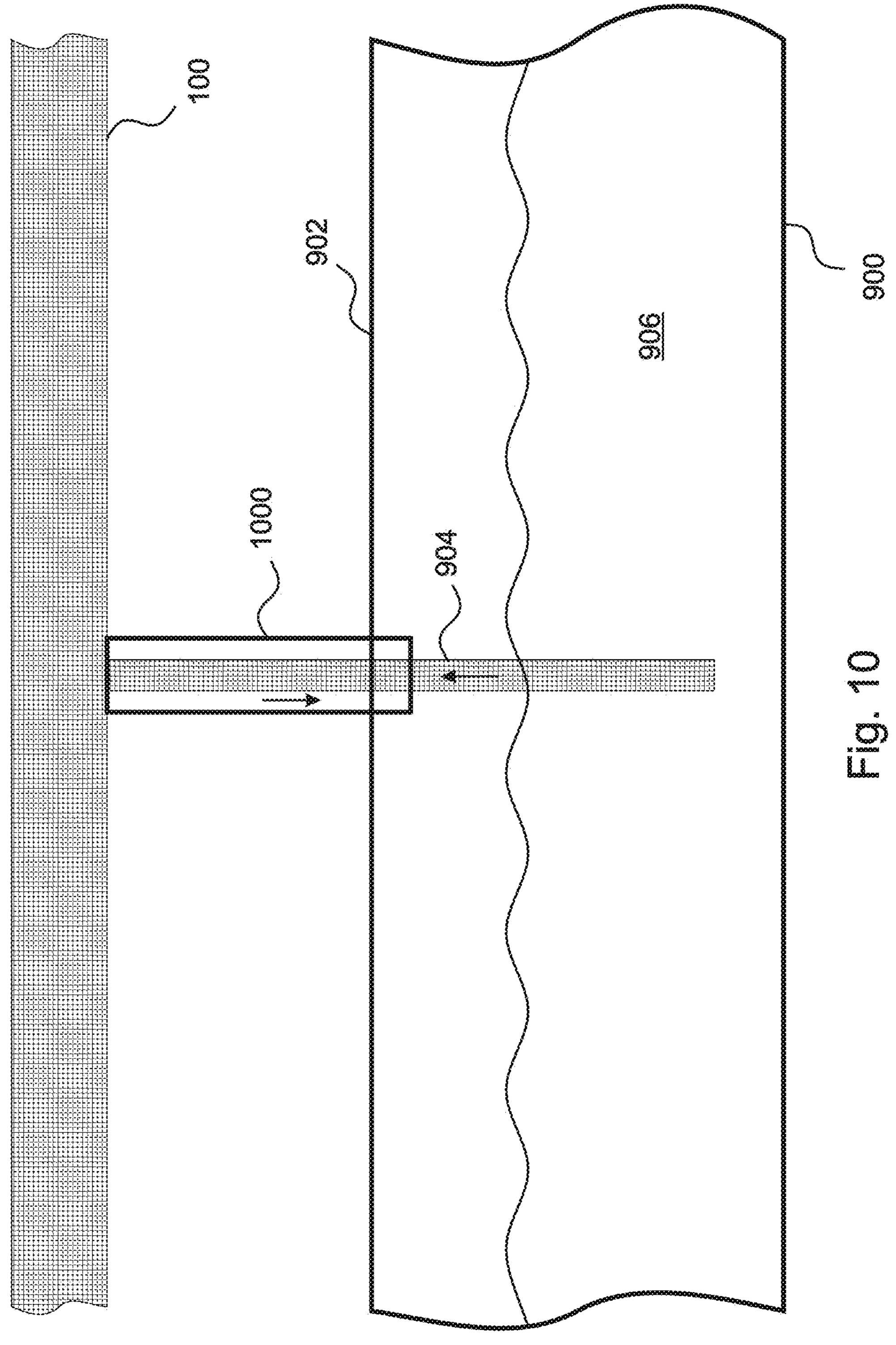
FIG. 10 is a cross-sectional view of an embodiment similar to FIG. 9, but further including hollow tubes that surround the wicks and extend toward the water reservoir.

With reference to FIG. 10, in some embodiments at least one hollow tube 1000 extends downward from the mat 100 through the lid 902, and into the water reservoir 900, thereby providing a channel through which excess water can rapidly flow from the mat 100 into the water reservoir 900. In the illustrated embodiment, a wick 904 is surrounded by the hollow tube 1000, thereby simplifying the penetration of the wick 904 through the lid 902 and into the water reservoir 900. According to these embodiments, water is able to flow down the hollow tubes and into the water reservoir during heavy rains and at other time where too much water is supplied to the mat and the SAP is saturated. In the embodiment of FIG. 10, the lid 902 of the water reservoir 900 is not perforated, but is simply penetrated by the hollow tubes 1000.

Figure 11:
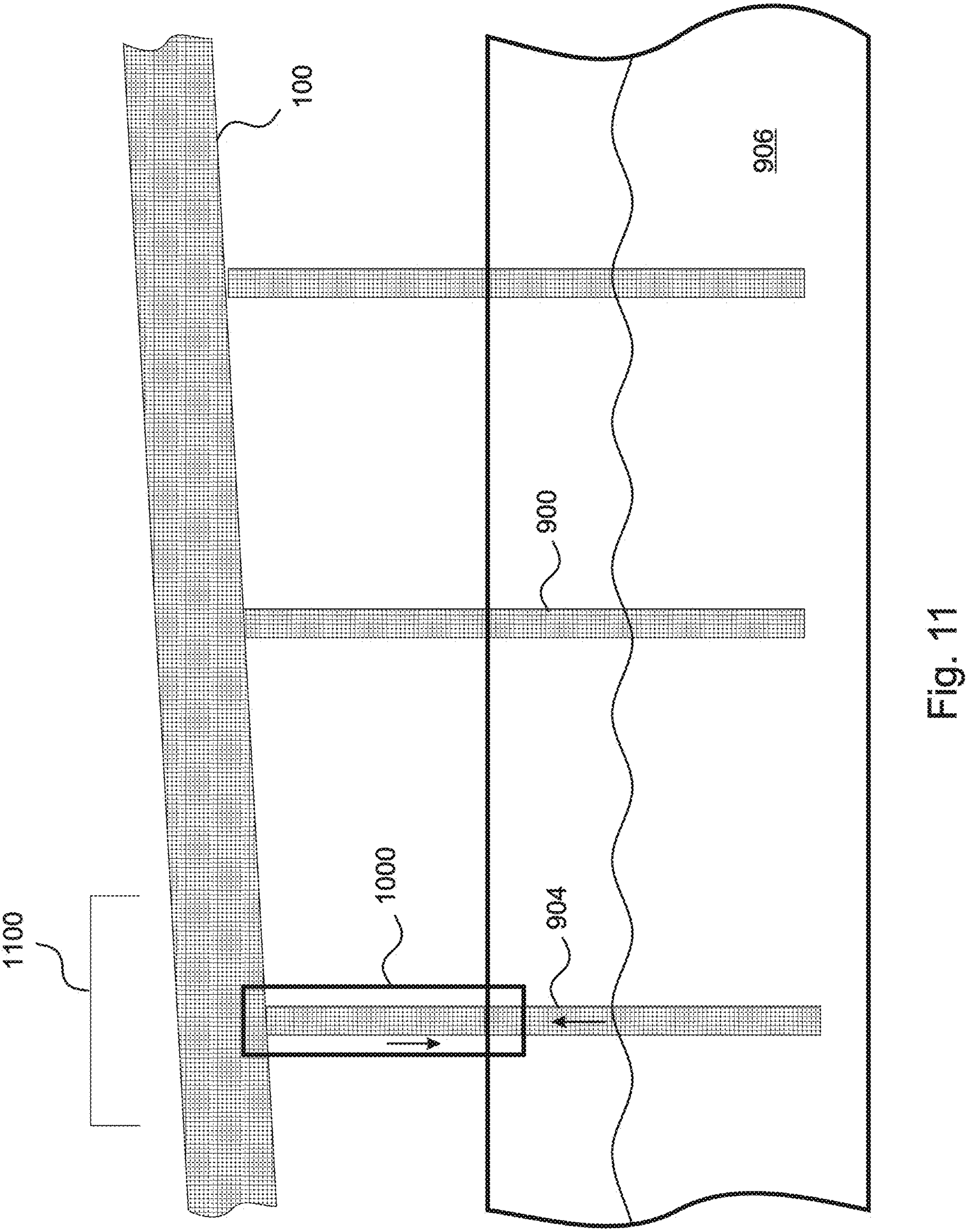
FIG. 11 is a cross-sectional view of an embodiment similar to FIG. 10, but wherein the mat is not flat and level, and a hollow tube extends toward the water reservoir only from a region of the mat where excess water will accumulate.

With reference to FIG. 11, if the mat 100 is not level and flat, at least one of the hollow tubes 1000 can extend downward into the water reservoir 900 from a lowest region 1100 of the mat 100, or from some other region of the mat 100 where excess water is likely to accumulate.

Figure 12:
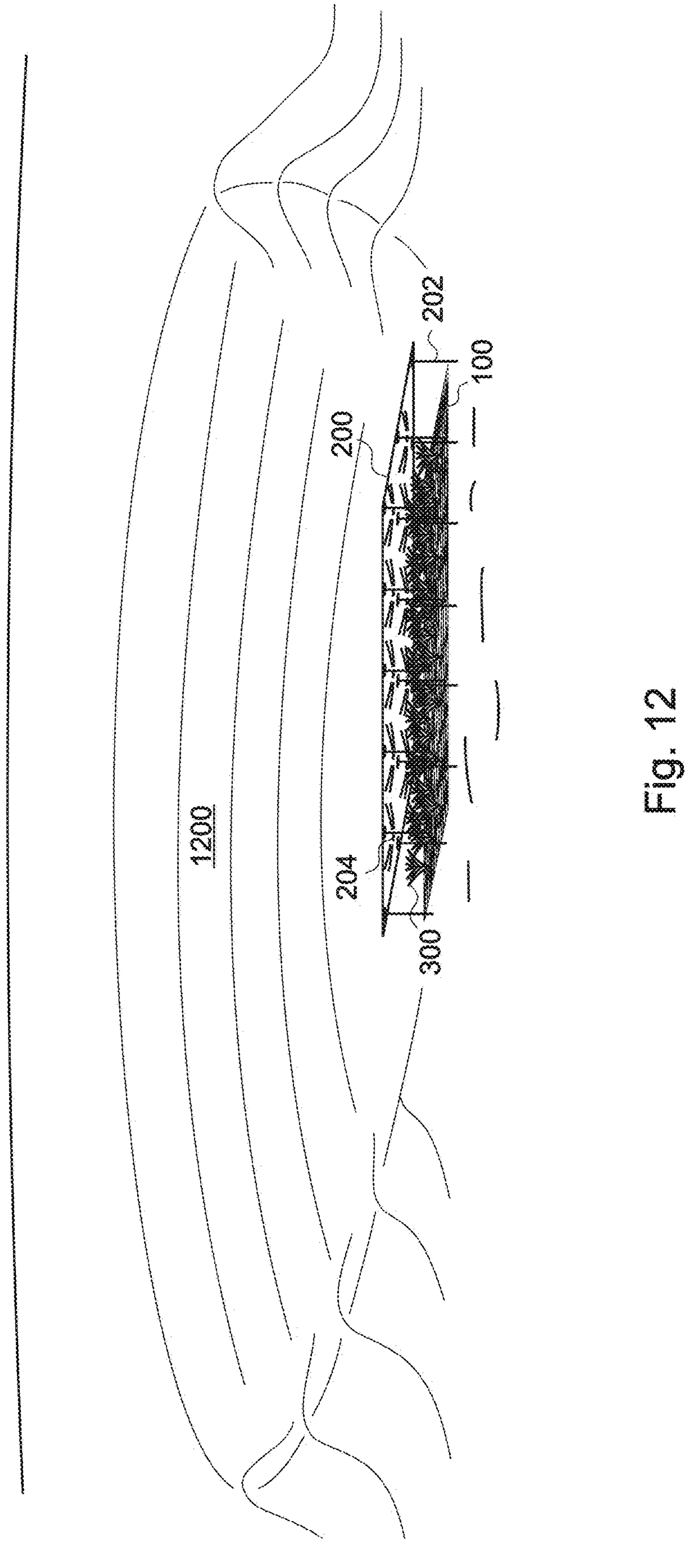
FIG. 12 is a perspective view of a mat placed in a sloping area shaped as a crescent moon.

With reference to FIG. 12, In addition to capturing and retaining rainwater that falls directly onto the mat 100, the present invention also provides a sloping area 1200 proximate the mat 100 that is configured to capture water that falls near but not onto the mat 100, and to cause the water to drain from the sloping area 1200 onto the mat 100. This approach greatly increases the amount of water during a rainstorm that is retained and delivered to the mat 100. While rainfall is rare in arid regions, such that the total annual rainfall is very low, nevertheless in some arid regions the rain can be heavy when there is a storm, such that even sandy ground is temporarily water saturated, and rainwater is able to flow across the water-saturated ground. The present invention takes advantage of this fact by placing the mat 100 at a lowest location where flowing rainwater will tend to drain.

The sloping area 1200 can be shaped substantially as a bowl, with the mat 100 placed at the center of the bowl. In other embodiments, such as in FIG. 12, the sloping area 1200 can be have a "crescent moon" shape, wherein the sloping area terminates at ends that curve inward toward the mat 100 and ensure that virtually all of the water that falls onto the sloping area is funneled to the mat 100. This crescent moon approach can be preferred, for example, if there is a naturally occurring slope that can be modestly re-shaped, so as to direct water to the mat 100. This approach also allows a plurality of mats 100 to be located, one above the other, on a large slope, with a crescent moon sloping area 1200 provided above each of the mats 100.

Embodiments further include a water barrier installed on or beneath the surface of the sloping area 1200, which further inhibits rainwater from being absorbed into the ground as it flows toward the mat 100. The water barrier can be a plastic sheet. In some embodiments, the water barrier is cellulosic or otherwise biodegradable.

In some embodiments, the mat 100 is placed at a location where rainwater will naturally tend to pool. In other embodiments, the sloping area 1200 is intentionally prepared in anticipation of installing the mat 100. Even in embodiments where little or no changes are made to a naturally sloping area 1200, the sloping area functions together with the mat assembly 700, and as such, the sloping area 1200 can be considered to be part of the disclosed apparatus.

Figure 13:
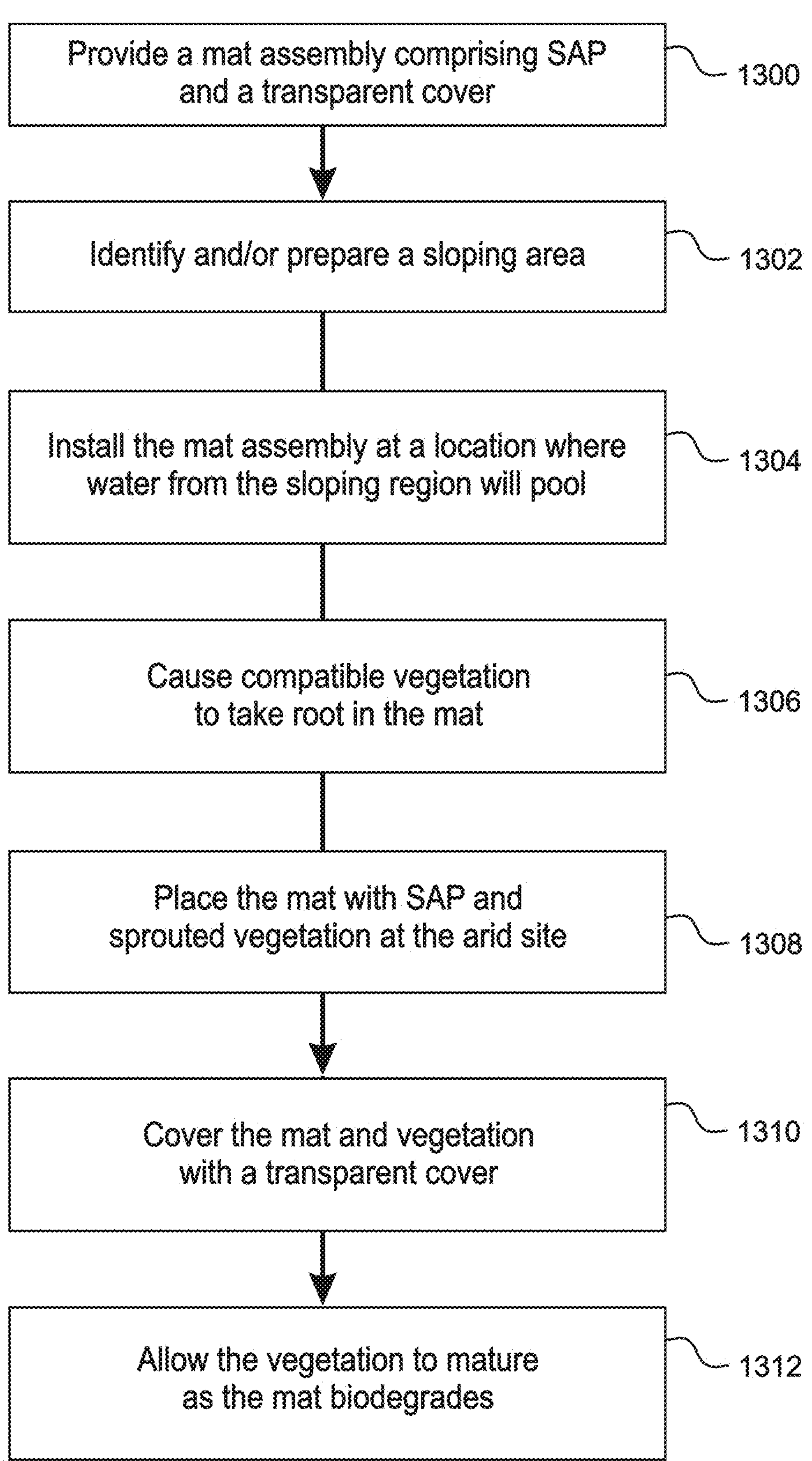
FIG. 13 is a flow diagram that illustrates a method embodiment of the present invention.

FIG. 13 is a flow diagram that illustrates steps included in method embodiments of the present invention. A mat assembly 500 is prepared 1300 that includes a mat 100, a transparent or semi-transparent, perforated cover sheet 200, and SAP incorporated into the mat 100. In embodiments, the mat 100 is biodegradable, and can include coir. In some embodiments, the SAP is also biodegradable. In embodiments, sand, soil, and/or fertilizer are also included with the mat 100. Any sand or soil that is included can be similar to sand or soil naturally found at the arid location 400. Embodiments further include a supporting structure, such as support stakes 202, that is configured to support the transparent cover 200 above the mat 100. In some embodiments the cover sheet 200 and/or stakes 202 are also biodegradable.

A sloping area 1200 is identified and/or prepared 1302, and the mat assembly 500 is installed 1304 at a lowest location where water flowing from the sloping area 1200 will tend to drain. The sloping area 1200 can be naturally occurring, or it can be partially or fully artificial, being constructed specifically to provide a location where the mat assembly 500 can be installed and water draining from the sloping area 1200 will drain to the mat 100. A water barrier can be placed onto or beneath a surface of the sloping area 1200.

One or more varieties of vegetation 300 are selected, and are caused to sprout and take root 1306 in the biodegradable mat 100. In the embodiment of FIG. 13, this takes place under controlled conditions before the mat is transferred to the arid location 400. In other embodiments, the vegetation 300 is caused to sprout and take root in the mat after it is installed at the arid location 400. Once the young vegetation 300 is established in the mat 100, in the embodiment of FIG. 13 the mat together with the SAP and rooted vegetation 300 is placed 1308 at the arid location 400, and is covered 1310 by the perforated, transparent cover 200 either placed directly onto the mat or supported by stakes 202 or another support structure, so as to allow sunlight in, as well as precipitation (through the perforations 204), while trapping most of the water vapor that is evaporated from the ground 400 and/or the mat 100.

Finally, the vegetation 300 is allowed to mature and take root 1312 in the underlying sand/soil 400. In embodiments the mat 100 eventually biodegrades. In some embodiments the transparent cover 200 and stakes 202 or other support structure are physically removed once the vegetation 300 is established, while in other embodiments some or all of the transparent cover 200 and/or stakes 202 and other support structure are biodegradable, and need not be removed once the mat 100 and cover 200 are placed at the arid location 400. Even if everything else is removed or biodegrades, the sloping area 1200 remains and continues to divert water to the vegetation 300 whenever it rains.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method for cultivating vegetation in an arid region, the method comprising:

providing a mat;

providing a super-absorbent polymer ("SAP") cooperative with the mat;

providing seeds of a selected variety of vegetation incorporated in the mat;

identifying or creating a sloping area in the arid region, the sloping area being configured to cause rainwater to drain to a lowest portion thereof;

installing the mat in the lowest portion of the sloping area; and covering the mat by placing a mat cover made from a transparent or semi-transparent material suspended above the mat or placed directly onto and in physical contact with substantially all of an upper surface of the mat;

said mat cover forming a physical barrier configured to cause water vapor beneath the mat cover to condense on an underside of the mat cover and drip onto the mat;

said mat cover being perforated at locations that are spaced apart, thereby allowing rain that falls onto the mat cover to drain through the perforations and be absorbed by the SAP that is cooperative with the mat.

2. The method of claim 1, wherein the mat is a woven mat.

3. The method of claim 1, wherein the sloping area is a bowl-shaped area, the lowest portion thereof being substantially in a center of the bowl-shaped area.

4. The method of claim 1, wherein the sloping area is shaped as a crescent moon, having ends that curve inward toward the mat and direct virtually all rainwater that falls on the sloping area toward the mat.

5. The method of claim 1, wherein the method further comprises installing a water impermeable barrier on or beneath a surface of the sloping area.

6. The method of claim 1, wherein the method further includes installing a reservoir below the mat.

7. The method of claim 6, wherein installing the reservoir comprises installing at least one wick configured to extend from the mat downward into the water reservoir, said wick being configured to draw water from the water reservoir to the SAP of the mat.

8. The method of claim 6, further comprising extending at least one hollow tube from the mat to the water reservoir, said hollow tube being configured to allow excess water to flow from the mat into the water reservoir.

9. An apparatus for cultivating vegetation at an inhospitable location in an arid region, the apparatus comprising:

a mat;

a super-absorbent polymer ("SAP") cooperative with the mat;

seeds incorporated in the mat;

a mat cover made from a transparent or semi-transparent material and configured to cover the mat, said mat cover being suspendable above the mat, or being placeable directly onto the mat so that it is in direct physical contact with the mat; and a sloping area located or created in the arid region, the sloping area being configured to cause rainwater to drain to a lowest portion thereof in which the mat can be installed;

said mat cover forming a physical barrier configured to cause water vapor beneath the mat cover to condense on an underside of the mat cover and drip onto the mat;

said mat cover being perforated at locations that are spaced apart, thereby allowing rain that falls onto the mat cover to drain through the perforations and be absorbed by the SAP that is cooperative with the mat.

10. The apparatus of claim 9, wherein the mat is a woven mat.

11. The apparatus of claim 9, wherein the sloping area is a bowl-shaped area, the lowest portion thereof being substantially in a center of the bowl-shaped area.

12. The apparatus of claim 9, wherein the sloping area is shaped as a crescent moon, having ends that curve inward toward the mat and direct virtually all rainwater that falls on the sloping area toward the mat.

13. The apparatus of claim 9, wherein the apparatus further comprises a water impermeable barrier installed on or beneath a surface of the sloping area.

14. The apparatus of claim 9, wherein the apparatus further includes a reservoir installed below the mat.

15. The apparatus of claim 14, wherein the apparatus further includes at least one wick configured to extend from the mat downward into the water reservoir, said wick being configured to draw water from the water reservoir to the SAP of the mat.

16. The apparatus of claim 15, wherein the wick includes at least one of nutrients and fertilizer, the at least one of nutrients and fertilizer being configured to be transported into the mat together with the water that is drawn from the water reservoir.

17. The apparatus of claim 15, further comprising at least one hollow tube configured to extend from the mat to the water reservoir, said hollow tube being configured to allow excess water to flow from the mat into the water reservoir.

18. The apparatus of claim 17, wherein the hollow tube surrounds at least one of the wicks.

19. The apparatus of claim 18, wherein the at least one wick extends below a lowest end of the hollow tube.

20. The apparatus of claim 17, wherein the hollow tube extends downward from a region of the mat where excess water is likely to accumulate.

* * * * *